United States Patent [19]

Milbourn

[11] Patent Number: 5,201,350
[45] Date of Patent: Apr. 13, 1993

[54] WORK HEAD WITH ROTATABLY MOUNTED CHAIN SAW

[76] Inventor: David E. Milbourn, Rte. 3, Box 696D, Hoquiam, Wash. 98550

[21] Appl. No.: 805,117

[22] Filed: Dec. 10, 1991

[51] Int. Cl.$^5$ .................... A01G 23/08; B27L 1/00
[52] U.S. Cl. .................... 144/2 Z; 30/379.5; 83/928; 56/15.2; 144/34 R; 144/343
[58] Field of Search ........ 56/10.7, 15.1, 15.2, 56/15.5, 400.4; 30/379, 379.5; 83/928; 144/2 Z, 3 D, 34 R, 343, 335, 336, 338, 356

[56] References Cited

U.S. PATENT DOCUMENTS

| | | | |
|---|---|---|---|
| 2,746,492 | 5/1956 | De Hardit | 30/379.5 |
| 2,815,048 | 12/1957 | Davis | |
| 3,343,575 | 9/1967 | Trout | 144/34 |
| 3,389,728 | 6/1968 | Galis | 144/34 R |
| 3,494,389 | 2/1970 | Thibodeau | |
| 3,565,372 | 2/1971 | Jones et al. | 144/34 R |
| 4,281,693 | 8/1981 | Moulson | 144/34 |
| 4,769,977 | 9/1988 | Milbourn | 56/15.2 |
| 4,802,327 | 2/1989 | Roberts | 56/15.2 |

FOREIGN PATENT DOCUMENTS 084990 8/1983 European Pat. Off. ............ 144/2 Z

*Primary Examiner*—W. Donald Bray
*Attorney, Agent, or Firm*—Joan H. Pauly

[57] ABSTRACT

A circular cutter wheel (34) is mounted on a work head housing (24) to rotate about a vertical axis (Y). A chain saw (76) is mounted on the housing (24) above the wheel (34). The saw (76) is mounted by a swivel device (42) which continuously rotates the saw (76) about a vertical axis (X) between a nonuse position in which the saw (76) extends over the housing (24) and a plurality of use positions in which it projects forwardly and/or laterally therefrom. The device (42) includes coaxial cylindrical housings (44, 48). The saw (76) is secured to an outer circumferential surface (82) of the outer housing (48). A motor (50) carried by the inner housing (44) rotates the outer housing (48) and saw (76).

16 Claims, 3 Drawing Sheets

WORK HEAD WITH ROTATABLY MOUNTED CHAIN SAW

TECHNICAL FIELD

This invention relates to cutter work heads and, more particularly, to a work head that is mountable on a boom structure and has a chain saw rotatably mounted thereon by a swivel device.

BACKGROUND INFORMATION

Tree limbing operations and tree limbing aspects of brush cutting operations are difficult to carry out when the limbs are relatively large and/or are relatively inaccessible. Limbs that are high up on a tree can be cut by hand by an operator who climbs the tree and uses a hand-held chain saw to cut the limbs. This type of operation is potentially dangerous and, thus, requires a high level of skill. In addition, it is time consuming and expensive to carry out. Some types of boom-mounted cutting heads are capable or removing limbs high up on a tree. However, known types of boom-mounted cutting heads have the serious limitation of being unable to cut limbs unless the side of the tree from which the limbs project can be approached directly by the machine which carries the boom structure. In situations in which surrounding trees or other obstructions prevent direct approach, the limbs must be cut by hand.

U.S. Pat. No. 2,815,048, granted Dec. 3, 1957, to G. Davis, discloses a mobile brush cutting machine having an articulated boom and a tool supporting head mounted on the outer end of the boom. The head includes a base on which a chain saw is mounted. The angle of the head relative to the boom is adjustable by means of a circular series of holes that selectively receive fasteners to allow adjustment about the boom axis. A series of arcuately arranged anchor holes similarly allow adjustment about a horizontal axis defined by the boom/head connection. The relative angular orientation does not change during the operation of the machine but, rather, remains the same until the pin connections are detached and a different set of holes is selected. The operator controls the position of the chain saw by pivoting the boom and extending and retracting the outer telescopic arm of the boom.

U.S. Pat. No. 3,494,389, granted Feb. 10, 1970, to J. L. Thibodeau, discloses apparatus for grasping, slashing (cutting to length), and loading felled timber. The apparatus includes a main boom, a knuckle boom attached to the main boom, a hoist bar attached to the outer end of the knuckle boom, and a clamp frame suspended from the bar. Jaws for gripping the timber are carried by the clamp frame. The manner in which the clamp frame is mounted maintains the jaws perpendicular to the ground. A hydraulically powered ring saw or chain saw is mounted on the frame. In each embodiment, the saw is movably mounted to achieve a cutting motion of the saw. The ring saw moves vertically to cut the timber. The chain saw is pivoted about a horizontal axis.

U.S. Pat. No. 4,281,693, granted Aug. 4, 1981, to D. C. Moulson, discloses tree felling apparatus that includes an articulated boom mounted on a tracked vehicle and a felling head mounted on the outer end of the boom. Moulson discusses prior art feller heads with chain saws movably mounted to pivot or translate while cutting. He states that the prior art feller heads present the problem of requiring too large a size of the head for boom mounting in order to accommodate the degree of movement of the chain saw required to sever larger trees. In the Moulson device, tree trunks are received into a recess on the head and secured by grippers. A chain saw motor is mounted on an arcuate track and is moved along the track to move the chain saw across the recess and cut a tree trunk gripped therein.

U.S. Pat. No. 3,343,575, granted Sep. 26, 1967, to T. E. Trout, discloses a rotary saw attachment for a backhoe. The attachment is pivotably mounted on an outer boom and carries a rotary disk saw that is pivotable about the axis of the attachment.

U.S. Pat. No. 4,802,327, granted Feb. 7, 1989, to C. A. Roberts, discloses a mower attachment for tractors that has a rotary disk cutter with a peripheral groove in which a cutting chain is mounted. U.S. Pat. No. 4,769,977, granted Sep. 13, 1988, to the present applicant, discloses a brush cutter having a head with a disk rotary cutter that is capable of limbing trees.

DISCLOSURE OF THE INVENTION

A subject of the invention is cutting apparatus comprising a boom structure mountable on a vehicle. The structure includes at least one boom having an outer end on which a work head is mounted. The head includes a mounting member. The cutting apparatus further comprises a chain saw and a swivel device. The device includes a first housing secured to the work head mounting member, a second housing rotatably carried by the first housing, and a swivel motor mounted on the first housing. The chain saw is secured to the second housing. The motor engages the second housing to rotate the chain saw between a first use position in which it projects forwardly from the mounting member and a second use position in which it projects laterally from the mounting member. The ability to rotate the chain saw into these positions enables an operator to cut around obstructions and to remove limbs from the sides and back of a tree (relative to the vehicle).

The chain saw includes an endless chain that forms a loop with a width. The chain saw may be mounted with this width in various orientations relative to the axis about which the motor rotates the chain saw. In the preferred embodiment, the width is substantially parallel to the axis.

The preferred form of the swivel device includes first and second housings that are each generally cylindrical. The first housing has a base portion secured to the work head mounting member and projects outwardly from the member. The second housing is coaxial with and surrounds an outer portion of the first housing. The apparatus comprises a plate to which the chain saw and an outer circumferential surface of the second housing are secured. This preferred form of the swivel device has the advantages of relative simplicity, durability, and ease of operation. It also is one way of providing another preferred feature of the invention, the capability of the swivel motor of rotating the chain saw continuously 360°. Such capability allows adjustment of the chain saw into a multiplicity of use positions to thereby reach virtually any limb on a tree.

Another subject of the invention is a work head for a brush cutting machine of the type having a boom structure including at least one boom. The work head comprises a main housing mountable on an outer end of the boom, a cutter wheel, and a chain saw. The cutter wheel is rotatably mounted on the housing to rotate about a first vertical axis. The chain saw is rotatably mounted on the housing above the wheel to rotate about a second vertical axis. The chain saw is rotatable about the second axis between a nonuse position in which it extends at least substantially over the housing, and a use position in which it projects horizontally beyond the housing.

The chain saw is preferably vertically oriented. As used herein, the term "vertically oriented" refers to the orientation of the chain saw loop width relative to the second axis of rotation described above. In this orientation, the loop width, i.e. the dimension between the two main legs of the chain loop, is parallel or substantially parallel to the axis. The terms "vertical" and "above" refer to the use orientation of the work head substantially shown in FIGS. 1 and 2. It is shown "substantially" because, in each of the two figures, there is a slight tilt to the work head orientation. The use orientation of the work head on which the chain saw is mounted can of course be varied considerably from that shown in FIGS. 1 and 2. This can be accomplished, for example, by moving the boom structure or moving the work head relative to the boom structure. In the apparatus shown in FIGS. 1 and 2, the work head is pivotable relative to the boom structure about a horizontal axis. In other embodiments, the work head could be movable in other manners, such as about the axis of the outer boom to which it is attached, in addition to or instead of the type of pivotal movement in the illustrated embodiment. The use of the terms "vertical", "horizontal", and "above" in reference to FIGS. 1 and 2 is used solely for the purpose of facilitating the disclosure and description of the invention. It s intended to be understood that, when the apparatus of the invention is in actual use, its orientation may vary considerably.

In the brush cutting work head of the invention, the chain saw is preferably rotatably mounted on the housing by means of a swivel device of the type described above. The chain saw is also preferably rotatable about the second axis between a plurality of use positions in each of which it projects horizontally beyond the main housing.

The apparatus of the invention has a number of advantages. It is relatively simple in structure and is also highly versatile and readily adaptable to a variety of different types of cutting operations. In accordance with the invention, the chain saw may be mounted so that it rotates in a cutting direction to permit a cutting operation to be carried out by moving the chain saw without moving the structure on which it is mounted. Other chain saw orientations may also be used. The vertical orientation described above is currently preferred because it is particularly well-suited to tree limbing operations. The vertical orientation facilitates limbing in a number of ways. It permits the positioning of the saw above or below a limb to be cut so that limitations due to the structure of the tree can be overcome by approaching a limb from a direction opposite to one which is relatively inaccessible. When the chain saw is positioned above the limb for cutting, the weight of the boom and work head can be used to assist the downward cutting motion of the chain saw. In addition, orienting the chain saw vertically helps to overcome the problem of the inaccessibility of limbs on sides of trees which cannot be approached by a machine on which a boom and work head are mounted. When a machine on which the preferred embodiment of the invention is mounted approaches a tree, limbs on the sides of the tree can easily be cut by the vertically oriented chain saw. The invention even makes it possible to cut limbs that are behind the tree relative to the machine. Thus, the preferred embodiment of the invention virtually eliminates any need for limbing by use of hand-held chain saws.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
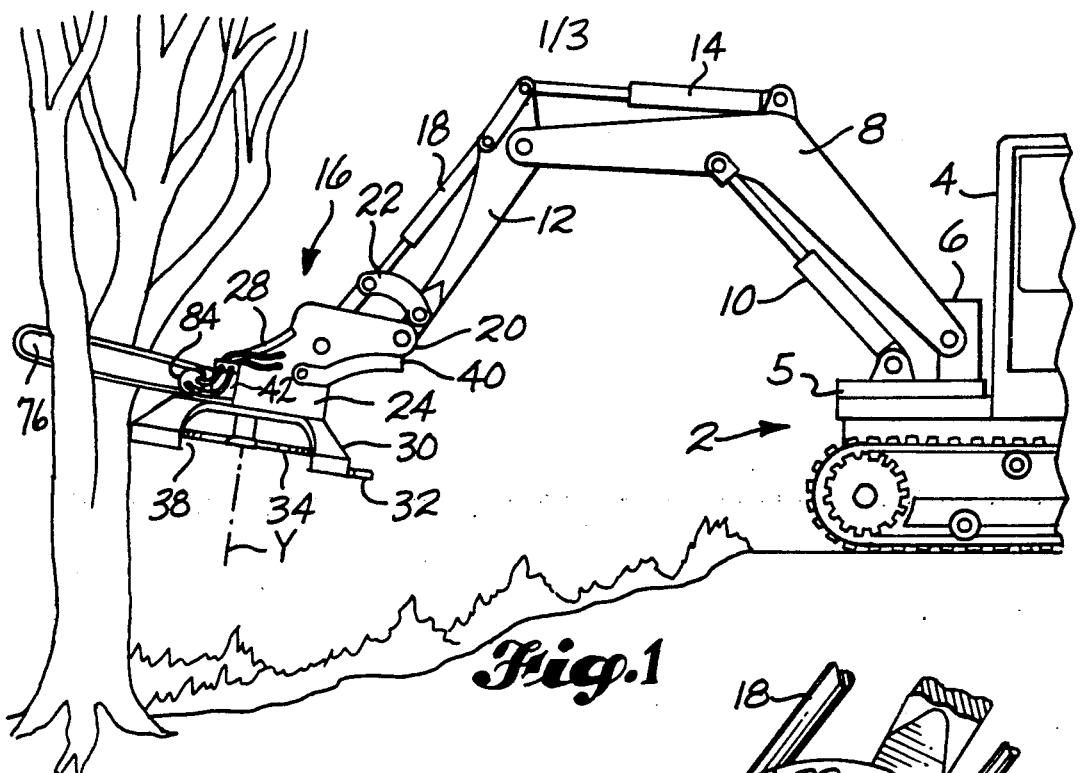
FIG. 1 is a pictorial view of the preferred embodiment of the invention mounted on a brush cutting machine and being used to cut a limb from a side of a tree.

The drawings show brush cutting apparatus that is constructed according to the invention and that constitutes the best mode for carrying out the invention currently known to the applicant. As shown in FIG. 1, the apparatus is attached to a tractor 2 of a common type in a two-boom arrangement. The tractor 2 and related structure are shown herein for the purpose of illustrating an installation of the apparatus of the invention. It is, of course, to be understood that the invention may also be used to advantage in connection with other types of tractors, backhoes, and similar machines, and with other boom arrangements. One example of another suitable boom arrangement is the three-boom structure disclosed in the applicant's U.S. Pat. No. 4,769,977, cited above.

Referring to FIG. 1, the tractor 2, boom structure, and basic work head 16 shown therein are of the same type as is disclosed in the applicant's copending application Ser. No. PCT/US90/05109, filed Sep. 11, 1990 in the U.S. Receiving Office. The tractor 2 has a cab 4 for the operator and a turntable 5 mounted to pivot about a vertical axis. A vertical post 6 is mounted on the turntable 5. A boom 8 of a known type is pivotally mounted on the post 6 to pivot about a horizontal axis. A hydraulic actuator 10 pivots the boom 8. An outer boom or stick 12 is pivotally mounted on the outer end of the inner boom 8. The stick 12 is pivoted relative to the boom 8 in a known manner by a hydraulic actuator 14. The actuator 14 is carried by the boom 8.

Figure 2:
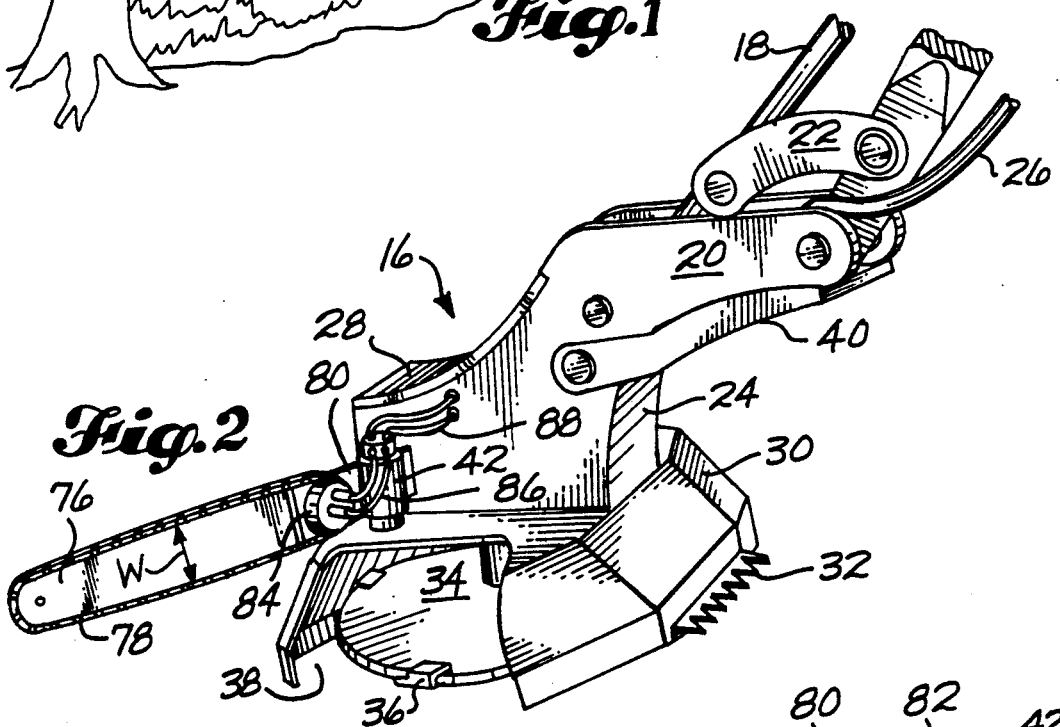
FIG. 2 is a pictorial view of the work head portion of the apparatus shown in FIG. 1 with the chain saw extending in an intermediate use position.
Figure 4:
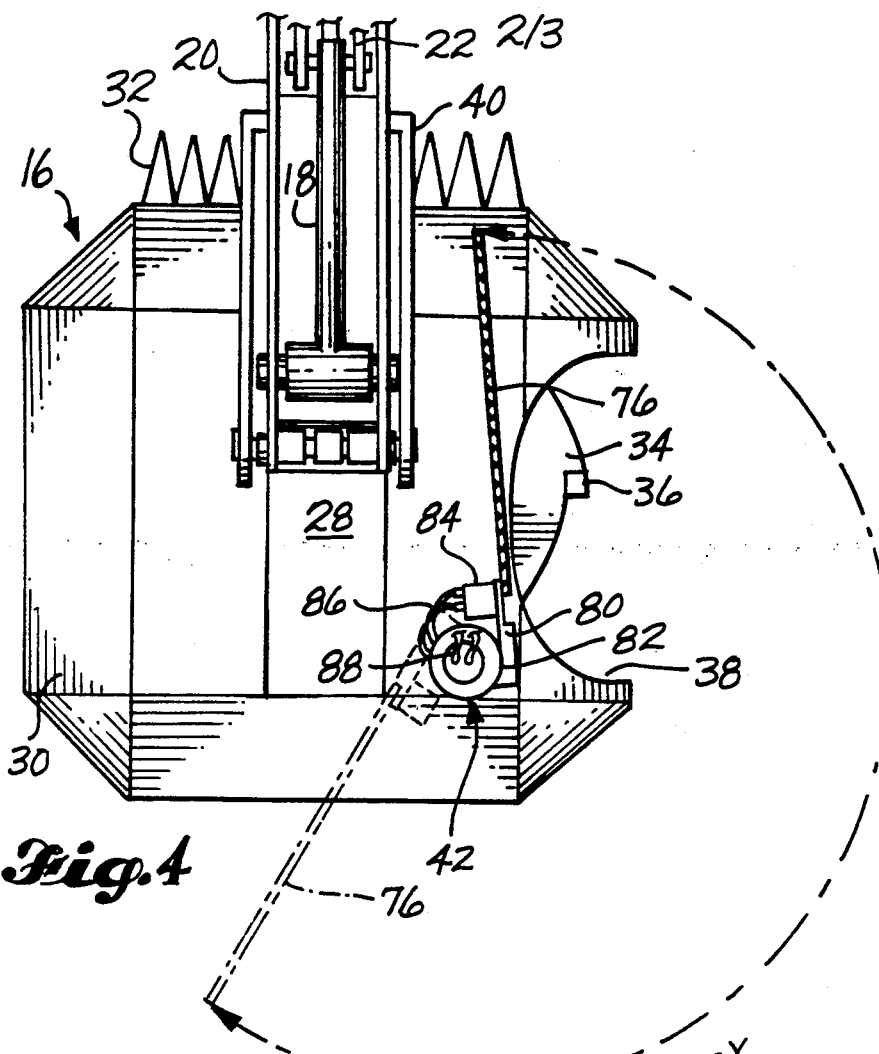
FIG. 4 is a top plan view of the work head shown in FIGS. 1 and 2 illustrating the range of swivel movement of the chain saw.

Referring to FIGS. 1, 2, and 4, the illustrated preferred embodiment of the work head 16 is mounted on the outer end of the stick 12. The work head 16 is pivotal relative to the stick 12 about a horizontal axis. The pivoting of the work head 16 is accomplished by a hydraulic actuator 18 that is pivotally attached to the stick 12 and engages an upper rear yoke portion 20 of the work head 16. The stick 12 is pivotally attached to the yoke 20 and is connected to the piston portion of the actuator 18 by a pair of links 22. A wrapped bundle of cables 26 extends outwardly and rearwardly from the yoke 20 and along the boom structure in a known manner to the control system of the tractor 2. The bundle 26 includes hydraulic hoses and wiring for operating the cutting wheel 34, chain saw 76, and swivel device 42, described further below.

The work head 16 includes a housing 24. The upper portion of the housing 24 is vertical and terminates at its upper end in the rearwardly projecting yoke 20 mentioned above. Forward of the yoke 20 the top of the upper vertical portion has a removable cover 28. The cover 28 at least substantially seals the upper portion of the housing 24 to exclude mud and debris and thereby protect the components mounted therein. The lower portion of the housing 24 forms a protective shroud 30. A jaw 32 comprising a plurality of teeth is formed on the lower rear edge of the shroud 30. A generally circular horizontal rotary cutting wheel 34 is mounted on the housing 24 to rotate about a vertical axis Y. The peripheral edge of the wheel 34 is substantially surrounded by the shroud 30. The mounting structure for the wheel 34 may take various forms and preferably includes the dirt seal arrangement described in the applicant's above-mentioned U.S. Pat. No. 4,769,977. The arrangement of cutting edges on the wheel 34 may also be varied considerably. In general, it preferably has a plurality of peripheral cutting teeth 36 and a plurality of teeth on its bottom and/or top face. The peripheral teeth 36 may, for example, take the form disclosed in the applicant's copending application entitled "Rotary Cutter Wheel and Removable Tooth Structure", Ser. No. 07/757,238, filed Sep. 10, 1991.

The shroud 30 has a vertical side opening 38 extending therethrough to expose a portion of the wheel 34 to enable the wheel 34 to engage and cut brush. Brush cutting heads are conventionally provided with openings in protective shrouds for this purpose. However, the openings are commonly in the front of the work head, rather than in a side portion of the work head, as in the preferred embodiment of the work head 16 shown in the drawings and described herein.

A gripping thumb 40 is also pivotally mounted on the work head 16. The thumb 40 is pivotal about a horizontal axis between a nonuse position in which it is substantially flush against the lower surface of the yoke 20, and a gripping position in which it cooperates with the jaw 32 to grip cut brush and other debris between the housing 24 and the thumb 40. The flush nonuse position is shown in FIGS. 1 and 2. The mounting of both the jaw 32 and the thumb 40 on the work head 16 provides the work head 16 with a complete gripping mechanism.

The basic object of the invention is to provide a work head on which a chain saw is mounted. According to the invention, the work head includes a mounting member, which in its simplest form may be merely a mounting plate, a yoke structure, or some other similarly simple support structure. The chain saw is rotatably mounted on the mounting member. In the illustrated preferred embodiment, the chain saw 76 is provided in combination with a cutting wheel 34, and the work head housing 24 serves as the mounting member. The chain saw 76 is mounted above the cutting wheel 34 by means of a swivel device 42. The device 42 is carried by a horizontal portion of the housing 24 that interconnects the upper vertical portion of the housing 24 and the shroud 30. In general, this horizontal portion of the housing 24 is preferably reinforced to provide a sturdy mounting base for the swivel device 42 and the chain saw 76. The location of the swivel mount on the work head 16 is best seen in FIGS. 1, 2, and 4.

Figure 5:
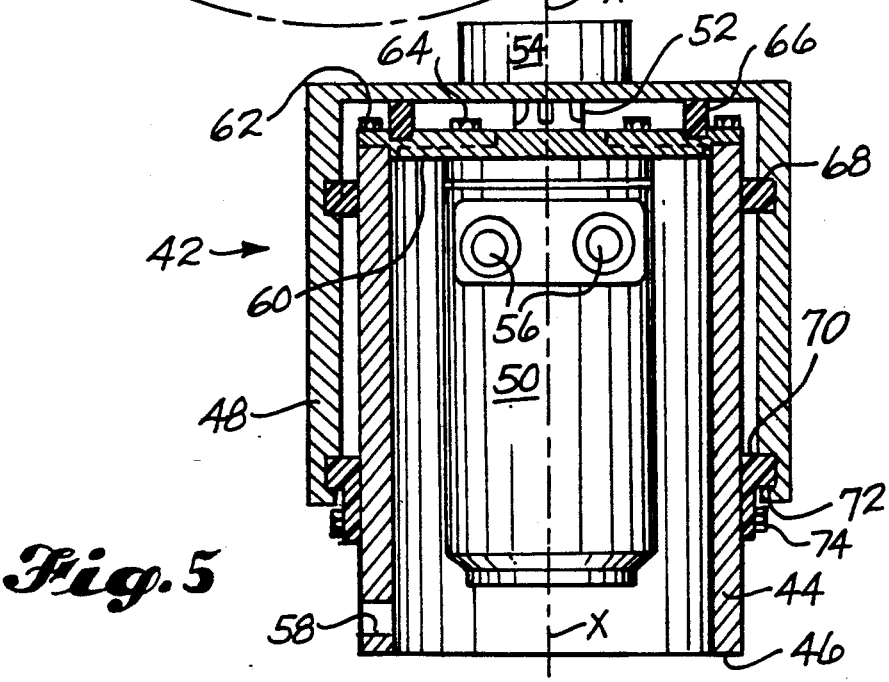
FIG. 5 is a sectional view taken along the line 5—5 in FIG. 3.

The structure of the swivel device 42 can best be seen in FIG. 5. The device 42 includes first and second housings 44, 48, both of which are generally cylindrical. The first housing 44 has a base 46 that is secured, such as by welding, to the horizontal portion of the work head housing 24. The housing 44 projects outwardly (upwardly) from the work head housing 24. The second housing 48 is coaxial with the first housing 44 and surrounds an outer or upper portion of the first housing 44. A hydraulic motor 50 is mounted within the first housing 44 to engage the second housing 48 and rotate it relative to the first housing 44. The motor 50 is secured to a top plate portion 60 of the first housing 44. A splined shaft 52 extends upwardly from the motor 50 rotatably through an opening in the top plate 60 and into a cap 54 secured to the integral top end wall of the second housing 48. Suitable grooves inside the cap 54 are engaged by the splines on the shaft 52 to rotate the second housing 48 with the shaft 52. The motor 50 may be of a conventional type, commonly known as a geroter motor, that is commercially available. The motor 50 has two ports 56 for hydraulic hoses. The hoses (not shown) extend out from the inner housing 44 through two hose openings 58. One of the openings 58 is shown in FIG. 5. The other opening is axially aligned with, and circumferentially spaced from, the illustrated opening 58. In order to facilitate assembly and disassembly of the device 42, the top plate 60 of the inner housing 44 is removably attached to the cylindrical sidewall of the housing 44 by fasteners 62, and the motor 50 is removably mounted on the top plate 60 by fasteners 64.

The outer housing 48 is supported on the inner housing 44 by means of annular bearings including a top bearing 66, a side bearing 68, and a lower bearing 70. The bearings 66, 68, 70 are preferably machined from flat stock ultra high molecular weight, wear resistant plastic. The lower bearing 70 has a radial lip 72, which is engaged in a groove on the outer housing 48, and an axial portion that extends downwardly from the lip 72 and is secured to the inner housing 44 by screw fasteners 74. The configuration of the lower bearing 70 maintains the outer housing 48 in position relative to the inner housing 44 while preserving the relative rotatability of the outer housing 48 and the ease with which the device 42 may be assembled and disassembled. It also helps to seal the space between the two housings 44, 48 against debris.

Figure 3:
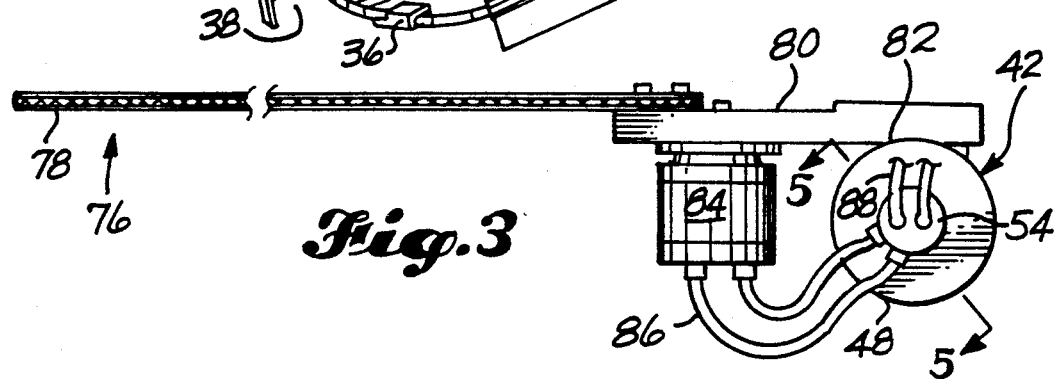
FIG. 3 is a top plan view of the chain saw and chain saw mounting structure shown in FIGS. 1 and 2.

The chain saw 76 is mounted on the work head housing 24 by means of the swivel device 42 to rotate about a vertical axis X (FIG. 5) defined by the motor shaft 52 and the housings 44, 48. The chain saw 76 has a conventional configuration with an elongated chain support around the perimeter of which an endless chain 78 is mounted. The width W of the chain saw 76, i.e. the distance between the two main legs of the elongated endless chain loop (FIG. 2), is preferably substantially parallel to the axis X. The saw 76 is powered by a hydraulic motor 84, which has sprockets that engage the chain 78 in a known manner. Both the saw 76 and the motor 84 are mounted on the outer housing 48 of the swivel device 42 by means of a mounting plate 80. This mounting arrangement can be seen in FIGS. 1–4, and most clearly in FIG. 3. The elements 76, 84 are bolted to opposite vertical faces of one end of the plate 80. The other end of the vertical face on which the motor 84 is mounted is secured to the outer circumferential surface 82 of the outer swivel housing 48, preferably by welding. Therefore, when the shaft 52 rotates the outer housing 48 via the upper cap 54, the mounting plate 80, chain saw 76, and chain saw motor 84 rotate with the housing 48. The hydraulic hoses 86 for the motor 84 extend from the motor 84 to the cylindrical outer circumferential surface of the cap 54. Communication of the motor 84 with the hydraulic system of the tractor 2 is provided by hoses 88 that are connected by swivel connections to the upper radial surface of the cap 54. The hoses extend into the work head housing 24 to the cable bundle 26.

Figure 6:
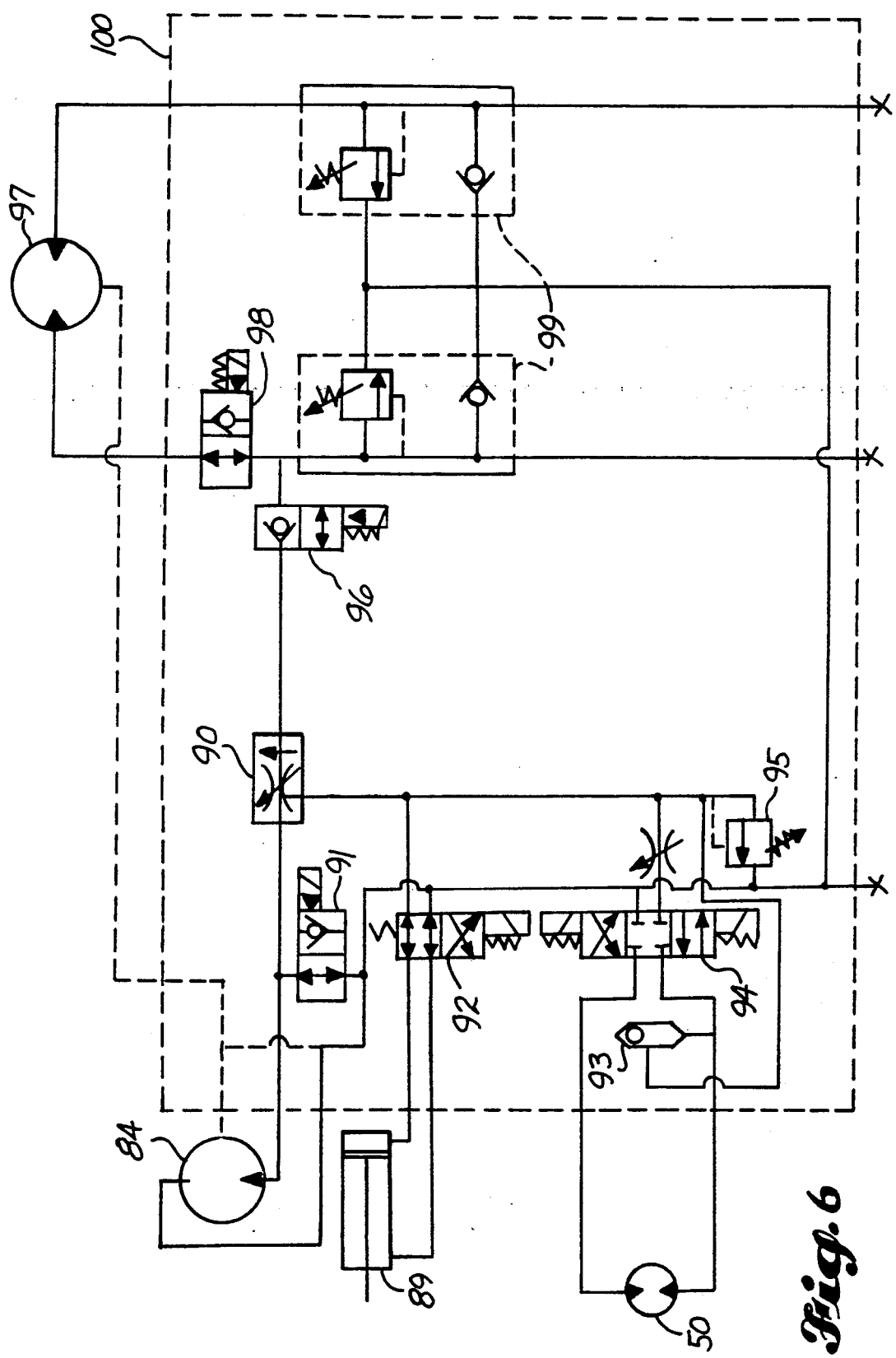
FIG. 6 is a diagram of a hydraulic circuit for the preferred embodiment shown in FIGS. 1-4 with provision for the additional feature of a retractable sprayer.

FIG. 6 is a schematic hydraulic circuit diagram for the illustrated apparatus. The diagram includes a cylinder 89 and related circuit elements for extending a spraying apparatus (not shown in FIGS. 1–5) of the type disclosed in the applicant's above-cited copending application Ser. No. PCT/US90/05109. Similar circuit elements to operate the thumb 40 could also be included in the circuit, but are not shown in FIG. 6. Referring to FIG. 6, the circuit is designed to power the hydraulic swivel motor 50 and chain saw motor 84 described above and a motor 97 for the rotary cutter wheel 34. The circuit includes a plurality of valves connected by a manifold 100. Solenoid controlled valves 91, 92, and 94 are provided for activation of motors 84, 89, 50, respectively, from the cab 4 of the tractor 2. The valve 91 that activates the chain saw motor 84 is a pilot operated two-way valve. The valve 92 that activates the sprayer cylinder 89 is a direct acting four-way, two-position valve. The valve 94 that activates the swivel motor 50 is a direct acting three-position, four-way valve. A relief valve 95 relieves the swivel motor 50 and extender cylinder 89. A shuttle valve 93 makes the relief valve 95 available to the swivel motor 50. A pair of solenoid controlled pilot operated two-way valves 96, 98 are operated simultaneously from the cab 4. A priority flow divider 90 is positioned between the valve 96 and the control valves 91, 92, 94. The cutter wheel motor 7 is protected by a pilot operated relief valve 99 that includes anti-cavitation check valves.

The swivel motor 50 is operated to rotate the chain saw 76 between a nonuse position and a plurality of use positions. In the nonuse position, the chain saw 76 extends over the work head housing 24, as shown in solid lines in FIG. 4. In each of the use positions, the chain saw 76 projects horizontally beyond the work head housing 24. The motor 50 rotates the housing 48 and the chain saw 76 continuously about the axis X and can position the chain saw 76 with its outer end at any point along the broken line arc shown in FIG. 4. Therefore, the number of use positions is theoretically unlimited. The motor is capable of rotating the saw 76 continuously 360°. However, in the illustrated installation, the actual range of rotational movement of the saw 76 is limited to about 120° by contact between the saw 76, or the plate 80 on which it is mounted, with the upper vertical portion of the housing 24. The use positions include positions in which the saw 76 projects forwardly from the work head 16, as shown in FIG. 1, and positions in which it projects laterally therefrom, as shown in FIG. 2. FIG. 1 shows the forwardly projecting saw 76 being used to cut a limb on the side of a tree. A laterally projecting position may be used to cut a limb from the back of a tree. One procedure for cutting a back limb is simply to approach the tree with the saw 76 already in a laterally projecting position. An alternative procedure is to position the work head 16 alongside the tree with the saw 76 in a forwardly projecting position and then operating the swivel motor 50 to rotate the saw 76 into a laterally projecting position.

It is anticipated that the primary use of the work head of the invention will be for tree limbing as part of brush cutting operations. However, it is intended to be understood that the work head of the invention may also be used to carry out other aspects of brush cutting operations and in the performance of cutting operations other than brush cutting.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. Cutting apparatus comprising:
   a boom structure mountable on a vehicle, said structure including at least one boom having an outer end;
   a work head mounted on said outer end, said head including a mounting member;
   a chain saw; and
   a swivel device comprising a first housing secured to said mounting member, a second housing which is rotatably carried by said first housing and to which said chain saw is secured, and a swivel motor mounted on said first housing and engaging said second housing to rotate said chain saw between a first use position in which said chain saw projects forwardly from said mounting member and a second use position in which said chain saw projects laterally from said mounting member.

2. Cutting apparatus comprising:
   a boom structure mountable on a vehicle, said structure including at least one boom having an outer end;
   a work head mounted on said outer end, said head including a mounting member;
   a chain saw; and
   a swivel device comprising a first housing secured to said mounting member, a second housing which is rotatably carried by said first housing and to which said chain saw is secured, and a swivel motor mounted on said first housing and engaging said second housing to rotate said chain saw between a first use position in which said chain saw projects forwardly from said mounting member and a second use position in which said chain saw projects laterally from said mounting member;
   in which said motor rotates said chain saw about an axis; and said chain saw includes an endless chain that forms a loop with a width that is substantially parallel to said axis.

3. The apparatus of claim 2, in which each of said first and second housings is generally cylindrical, said first housing has a base portion secured to said member and projects outwardly from said member, and said second housing is coaxial with and surrounds an outer portion of said first housing; and which comprises a plate to which said chain saw and an outer circumferential surface of said second housing are secured.

4. Cutting apparatus comprising:
   a boom structure mountable on a vehicle, said structure including at least one boom having an outer end;

a work head mounted on said outer end, said head including a mounting member;
a chain saw; and
a swivel device comprising a first housing secured to said mounting member, a second housing which is rotatably carried by said first housing and to which said chain saw is secured, and a swivel motor mounted on said first housing and engaging said second housing to rotate said chain saw between a first use position in which said chain saw projects forwardly from said mounting member and a second use position in which said chain saw projects laterally from said mounting member;
in which each of said first and second housings is generally cylindrical, said first housing has a base portion secured to said member and projects outwardly from said member, and said second housing is coaxial with and surrounds an outer portion of said first housing; and which comprises a plate to which said chain saw and an outer circumferential surface of said second housing are secured.

5. A work head for a brush cutting machine of the type having a boom structure including at least one boom, comprising:
a main housing mountable on an outer end of said boom;
a cutter wheel rotatably mounted on said housing to rotate about a first vertical axis; and
a chain saw rotatably mounted on said housing above said wheel to rotate about a second vertical axis; said chain saw having a nonuse position in which it extends at least substantially over said housing, and a use position in which it projects horizontally beyond said housing; and said chain saw being rotatable about said second vertical axis between said positions.

6. The work head of claim 5, which comprises a swivel device comprising a first swivel housing secured to said main housing, a second swivel housing rotatably carried by said first swivel housing, and a swivel motor mounted on said first swivel housing and engaging said second swivel housing to rotate said second swivel housing relative to said first swivel housing; said chain saw being secured to said second swivel housing.

7. The work head of claim 6, in which each of said first and second swivel housings is generally cylindrical, said first swivel housing has a base portion secured to said main housing and projects outwardly from said main housing, and said second swivel housing is coaxial with and surrounds an outer portion of said first swivel housing; and which comprises a plate to which said chain saw and an outer circumferential surface of said second swivel housing are secured.

8. The work head of claim 7, in which said chain saw has a plurality of use positions in each of which it projects horizontally beyond said main housing, and said chain saw is rotatable about said second vertical axis between said use positions.

9. The work head of claim 6, in which said chain saw has a plurality of use positions in each of which it projects horizontally beyond said main housing, and said chain saw is rotatable about said second vertical axis between said use positions.

10. The work head of claim 5, in which said chain saw has a plurality of use positions in each of which it projects horizontally beyond said main housing, and said chain saw is rotatable about said second vertical axis between said use positions.

11. The work head of claim 5, in which said chain saw is vertically oriented.

12. The work head of claim 6, in which said chain saw is vertically oriented.

13. The work head of claim 7, in which said chain saw is vertically oriented.

14. The work head of claim 8, in which said chain saw is vertically oriented.

15. The work head of claim 9, in which said chain saw is vertically oriented.

16. The work head of claim 10, in which said chain saw is vertically oriented.

* * * * *